(12) United States Patent
Xiang et al.

(10) Patent No.: US 11,711,249 B2
(45) Date of Patent: Jul. 25, 2023

(54) METHOD FOR PERFORMING CHANNEL SOUNDING BETWEEN TERMINALS, NETWORK SIDE DEVICE, AND TERMINAL

(71) Applicant: HUAWEI TECHNOLOGIES CO., LTD., Shenzhen (CN)

(72) Inventors: Zhengzheng Xiang, Shanghai (CN); Jiyong Pang, Shanghai (CN); Hongjia Su, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 16/547,587

(22) Filed: Aug. 22, 2019

(65) Prior Publication Data

US 2019/0379508 A1 Dec. 12, 2019

Related U.S. Application Data

(63) Continuation of application No. PCT/CN2018/073448, filed on Jan. 19, 2018.

(30) Foreign Application Priority Data

Feb. 23, 2017 (CN) .......................... 201710100989.7

(51) Int. Cl.
*H04W 76/00* (2018.01)
*H04L 27/26* (2006.01)
(Continued)

(52) U.S. Cl.
CPC ........ *H04L 27/2602* (2013.01); *H04L 5/0048* (2013.01); *H04L 5/0051* (2013.01);
(Continued)

(58) Field of Classification Search
CPC ............. H04L 25/0224; H04L 27/2602; H04L 27/261; H04L 5/0033; H04L 5/0048;
(Continued)

(56) References Cited

U.S. PATENT DOCUMENTS

2009/0109908 A1 4/2009 Bertrand et al.
2013/0121290 A1 5/2013 Kim et al.
(Continued)

FOREIGN PATENT DOCUMENTS

CN 103036663 A 4/2013
CN 103067132 A 4/2013
(Continued)

OTHER PUBLICATIONS

Vasudevan Subramanian et al: "Enabling Data Offload and Proximity Services Using Device to Device Communication over Licensed Cellular Spectrum with Infrastructure Control", 2013 IEEE 78th Vehicular Technology Conference (VTC FALL), IEEE, Sep. 2, 2013, pp. 1-7, XP032548634.
(Continued)

*Primary Examiner* — Khaled M Kassim
*Assistant Examiner* — Zhaohui Yang
(74) *Attorney, Agent, or Firm* — Hauptman Ham, LLP

(57) ABSTRACT

Embodiments relate to the field of wireless communication technologies and provide a method for performing channel sounding, a network-side device, and a terminal. A first terminal sends a resource scheduling request to a network-side device when the first terminal starts a communication connection with a second terminal. The resource scheduling request carrying information about the second terminal requests the network-side device to allocate a transmission resource for channel sounding between the first terminal and the second terminal. The first terminal receives a sounding reference signal sent by the second terminal, and obtains information of a channel for communication between the first terminal and the second terminal. The method enables quick and effective channel sounding between terminals, thereby increasing communication efficiency between the terminals.

13 Claims, 8 Drawing Sheets

(51) Int. Cl.
*H04W 76/14* (2018.01)
*H04L 5/00* (2006.01)
*H04W 8/00* (2009.01)
*H04W 72/0446* (2023.01)
*H04W 72/121* (2023.01)
*H04W 72/23* (2023.01)

(52) U.S. Cl.
CPC ............ *H04L 27/261* (2013.01); *H04W 8/005* (2013.01); *H04W 72/0446* (2013.01); *H04W 72/121* (2013.01); *H04W 76/14* (2018.02); *H04W 72/23* (2023.01)

(58) Field of Classification Search
CPC ... H04L 5/0051; H04L 5/0053; H04L 5/0069; H04L 5/0082; H04L 5/0091; H04W 4/70; H04W 72/042; H04W 72/0446; H04W 72/121; H04W 76/14; H04W 8/005
See application file for complete search history.

(56) References Cited

U.S. PATENT DOCUMENTS

| | | |
|---|---|---|
| 2013/0294282 A1 | 11/2013 | Seo |
| 2014/0064218 A1 | 3/2014 | Kim et al. |
| 2015/0110037 A1* | 4/2015 | Wu ..................... H04L 5/0048 370/329 |
| 2015/0195063 A1 | 7/2015 | Ro et al. |
| 2016/0157190 A1 | 6/2016 | Seo et al. |
| 2017/0142697 A1 | 5/2017 | Dai et al. |
| 2019/0045544 A1* | 2/2019 | Wang ..................... H04L 5/0094 |
| 2020/0235961 A1* | 7/2020 | Kim ....................... H04L 5/0053 |

FOREIGN PATENT DOCUMENTS

| | | |
|---|---|---|
| CN | 103457690 A | 12/2013 |
| CN | 103781126 A | 5/2014 |
| CN | 104125610 A | 10/2014 |
| WO | 2013000245 A1 | 1/2013 |

OTHER PUBLICATIONS

Lei Lei et al: "Operator controlled device-to-device communications in LTE-advanced networks", Technical Report of Wireless Networking Group, Coordinated Science Laboratory; Dept. Electrical and Computer Engineering; University of Illinois at Urbanachampaign, US, vol. 19,No. 3, Jun. 1, 2012, pp. 96-104, XP011480414.

Botsov Mladen et al: "On the overhead of radio resource management schemes for mobile underlay D2D communication", 2016 IEEE Vehicular Networking Conference (VNC), IEEE, Dec. 8, 2016, pp. 1-8, XP033052779.

* cited by examiner

METHOD FOR PERFORMING CHANNEL SOUNDING BETWEEN TERMINALS, NETWORK SIDE DEVICE, AND TERMINAL

CROSS-REFERENCE TO RELATED APPLICATIONS

This application is a continuation of International Application No. PCT/CN2018/073448, filed on Jan. 19, 2018, which claims priority to Chinese Patent Application No. 201710100989.7, filed on Feb. 23, 2017. The disclosures of the aforementioned applications are hereby incorporated by reference in their entireties.

TECHNICAL FIELD

This application relates to the field of wireless communication technologies, and in particular, to a method for performing channel sounding between terminals, a network-side device, and a terminal.

BACKGROUND

Wireless communication technologies develop from a first-generation wireless communications system based on an analog communication system, to a 2G wireless communications system represented by a global system for mobile communications (GSM) and IS-95, then to a 3G wireless communications system represented by wideband code division multiple access (WCDMA), and to the current 4G long term evolution (LTE) wireless communications system that has been widely used commercially worldwide and has achieved great success. In addition, a service supported by the wireless communications system also develops initially from voice to the SMS, and then to currently supported wireless high-speed data communications. At the same time, the worldwide number of wireless connections grows continuously and rapidly, and various new types of wireless services emerge, such as Internet of things and virtual reality (VR). These all pose higher requirements for a next generation wireless communications system.

In communication technology used between terminals, direct communication between short-distance terminals can be implemented without assistance from a third party, to share heavy network loads on a wireless cellular network, supplement an existing cellular network architecture, and generate new profit and revenue. In addition, based on an essential advantage of short-distance communication, in the communication technology used between the terminals, spectrum efficiency can be further improved, relatively high throughput performance can be obtained, and a relatively low transmission delay can be implemented.

In the prior art, a broadcast service between the terminals is based on a physical layer. Consequently, communication efficiency between the terminals is relatively low.

SUMMARY

Embodiments of the present disclosure describe a method for performing channel sounding between terminals, an apparatus, and a system.

In an aspect, an embodiment of this disclosure provides a method for performing channel sounding between terminals. The method includes: actively sending, by a first terminal, a resource scheduling request to a network-side device when the first terminal needs to communicate with a second terminal, where the resource scheduling request is used to request the network-side device to allocate a transmission resource used for channel sounding between the first terminal and the second terminal, and the resource scheduling request carries information about the second terminal, for example, at least one of a quantity of second terminals, a type of the second terminal, and an identifier of the second terminal that are obtained by the first terminal through channel sounding; and after receiving the resource scheduling request from the first terminal, configuring, by the network-side device for the second terminal, a transmission resource used for channel sounding, and sending, by the second terminal, a sounding reference signal (SRS) to the first terminal on the transmission resource, so that the first terminal quickly and effectively performs channel sounding and obtains information about a channel used for communication between the first terminal and the second terminal.

In one embodiment, the network-side device configures, for the first terminal, a transmission resource used for channel sounding, and the first terminal sends sounding control signaling on the transmission resource, where the sounding control signaling is used to trigger the second terminal to send a sounding reference signal.

In a possible design, the transmission resource used for channel sounding is implemented based on a flexible subframe, and both information about a transmit end and information about a receive end may be transmitted on the flexible subframe. The flexible subframe may be a self-contained subframe.

The subframe includes a first part that is used as a transmission resource for the sounding control signaling, and the first part is used by the first terminal to transmit the sounding control signaling to the second terminal;

the subframe further includes a second part that is used as a transmission resource for the sounding reference signal, and the second part is used by the second terminal to transmit the sounding reference signal to the first terminal; and there is a guard interval between the first part and the second part of the subframe.

In an implementation, the subframe includes 14 symbols; the first part of the subframe is a first symbol to a ninth symbol, the guard interval is a tenth symbol, and the second part is an eleventh symbol to a fourteenth symbol; or the first part of the subframe is a first symbol to a tenth symbol, the guard interval is an eleventh symbol, and the second part is a twelfth symbol to a fourteenth symbol; or the first part of the subframe is a first symbol to a third symbol, the guard interval is a fourth symbol, and the second part is a fifth symbol to a fourteenth symbol; or the first part of the subframe is a first symbol and a second symbol, the guard interval is a third symbol, and the second part is a fourth symbol to a fourteenth symbol, where in the solutions provided in this embodiment, because both the sounding control signaling and the sounding reference signal can be transmitted on a same subframe, channel sounding can be quickly and effectively performed, and a transmission delay is reduced, thereby improving communication efficiency and resource utilization.

In another possible implementation, the transmission resource used for channel sounding is implemented based on an uplink subframe used for channel sounding or an uplink subframe used for communication.

In still another possible implementation, the transmission resource used for channel sounding is implemented based on a slot or a mini-slot.

In addition, the first terminal represents a transmit end in communication, and the second terminal represents a receive end in communication. A quantity of first terminals and a type of the first terminal, and a quantity of second terminals and a type of the second terminal are not limited. In an optional implementation, the first terminal and the second terminal may be terminals with a same attribute. For example, adjacent terminals are classified into one attribute group based on geographical location information, or terminals having a same service are classified into one attribute group based on a service type, or terminals in a same type are classified into one attribute group based on a terminal type. For example, the terminals are all in-vehicle terminals or mobile phone terminals. Terminals in a same attribute group perform channel sounding and establish a communications link, to effectively reduce signaling overheads.

In another aspect, an embodiment of this disclosure provides a network-side device. The network-side device may be a base station, or may be a control node.

In an implementation, the network-side device includes:

a transceiver, configured to receive a resource scheduling request from a first terminal, where the resource scheduling request is used to request the network-side device to allocate a transmission resource used for channel sounding between the first terminal and a second terminal, and the resource scheduling request carries information about the second terminal; and a processor, configured to allocate the transmission resource to the second terminal, where the transmission resource includes at least a transmission resource that is used by the second terminal to send a sounding reference signal.

In another aspect, an embodiment of this disclosure provides a base station. The base station has a function of implementing operations of the base station in the foregoing method designs. The function may be implemented by hardware, or may be implemented by executing corresponding software by hardware. The hardware or the software includes one or more modules corresponding to the foregoing function.

In a possible design, a structure of the base station includes a processor and a transceiver. The processor is configured to support the base station in performing corresponding functions in the foregoing method. The transceiver is configured to: support communication between the base station and a terminal, send information or signaling in the foregoing method to the terminal, and receive information or signaling sent by the terminal. The base station may further include a memory, and the memory is configured to: couple to the processor and store a program instruction and data that are necessary for the base station.

In still another aspect, an embodiment of the present invention provides a terminal. The terminal has a function of implementing operations of the terminal in the foregoing method designs.

The function of the terminal may be implemented by hardware. In an implementation, the terminal includes:

a transceiver, configured to send a resource scheduling request to a network-side device, where the resource scheduling request is used to request the network-side device to allocate a transmission resource used for channel sounding between the terminal and another terminal, and the resource scheduling request carries information about the another terminal, where the transceiver is further configured to receive a sounding reference signal that is sent by the another terminal on the transmission resource allocated by the network-side device; and a processor, configured to obtain information about a channel used for communication between the terminal and the another terminal.

The function of the terminal may alternatively be implemented by executing corresponding software by hardware. The hardware or the software includes one or more modules corresponding to the foregoing function. The module may be software and/or hardware.

In still another aspect, an embodiment of this disclosure provides a control node. The control node may include a controller/processor, a memory, and a communications interface. The controller/processor may be configured to coordinate resource management and configuration between a plurality of base stations, and may be configured to perform the resource configuration method described in the foregoing embodiment. The memory may be configured to store program code and data of the control node. The communications interface is configured to support the control node in communicating with a base station, for example, sending information about a configured resource to the base station.

In still another aspect, an embodiment of this disclosure provides a communications system. The system includes the base station and the terminal that are described in the foregoing aspects. In one embodiment, the communications system may further include the control node in the foregoing embodiment.

In yet another aspect, an embodiment of this disclosure provides a computer storage medium. The computer storage medium is configured to store a computer software instruction used by the foregoing base station. The computer software instruction includes a program designed for performing the foregoing aspects.

In yet another aspect, an embodiment of this disclosure provides a computer storage medium. The computer storage medium is configured to store a computer software instruction used by the foregoing terminal. The computer software instruction includes a program designed for performing the foregoing aspects.

Based on the technical solutions provided in the embodiments of this disclosure, the terminal actively triggers a process of channel sounding between terminals. Further, the network-side device separately configures, for the terminals, transmission resources for transmitting the sounding control signaling and the sounding reference signal that are used for channel sounding between the terminals. This is applicable to various scenarios and modes, to quickly and effectively perform channel sounding between the terminals, thereby improving efficiency of communication between the terminals.

BRIEF DESCRIPTION OF DRAWINGS

To describe embodiments of this disclosure more clearly, the following briefly describes the accompanying drawings required for describing the embodiments. Apparently, the accompanying drawings in the following description show merely some embodiments of this disclosure, and a person of ordinary skill in the art may derive other drawings from these accompanying drawings without creative efforts.

DESCRIPTION OF EMBODIMENTS

The following describes the technical solutions in the embodiments of this disclosure with reference to the accompanying drawings in the embodiments of this disclosure.

Figure 1:
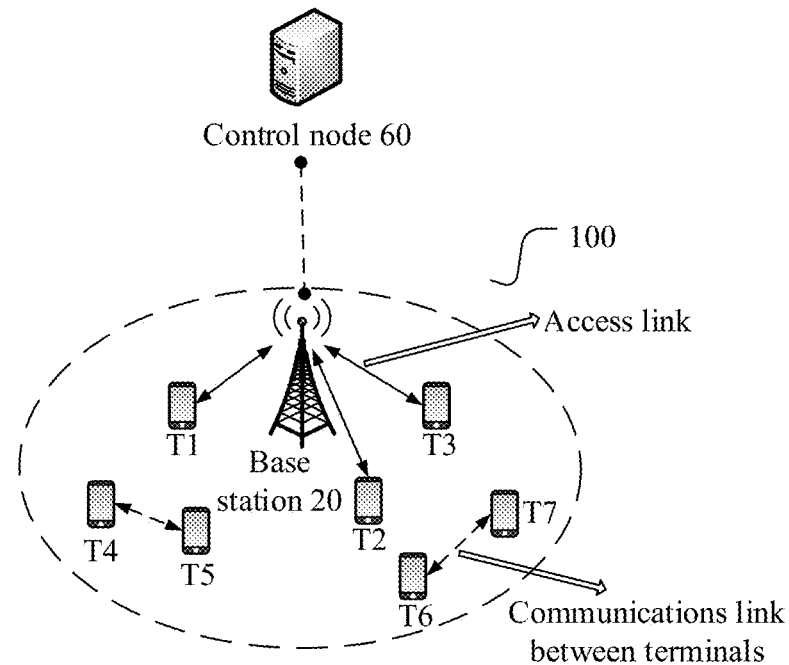
FIG. 1 is a schematic diagram of a communications system according to an embodiment of this disclosure.

To resolve a problem of low efficiency of communication between terminals in a communications system in the prior art, embodiments of this disclosure provide a solution that is based on a communications system shown in FIG. 1, to increase efficiency of the communication between the terminals in the communications system.

In the embodiments of this disclosure, the communication between the terminals has a communication mode such as Device to Device (D2D), Machine to Machine, (M2M), or UE cooperation.

An embodiment of this disclosure provides a communications system. The communications system includes at least one network-side device and a plurality of terminals. It should be noted that the network-side device may be a base station shown in FIG. 1, or a control node connected to a base station, or any device on a network-side that has a resource configuration function, a resource scheduling function, or a decision-making function for resource multiplexing. For ease of understanding, a base station is used as an example for the description below. As shown in FIG. 1, an embodiment of this disclosure provides a communications system 100. The communications system 100 includes at least one base station (BS) and a plurality of terminals. For ease of description, in the figure, the letter T denotes the terminal, and BS denotes the base station. The plurality of terminals include at least two terminals that can communicate with each other, for example, T4 and T5, and T6 and T7 in FIG. 1. Links between two terminals that communicate with each other may be referred to as a communications link pair. The two terminals in the communications link pair may be respectively a receive end and a transmit end. During transmission, one terminal may be the transmit end, and the other terminal may be the receive end. For example, the terminal T4 may be the transmit end, and the terminal T5 may be the receive end. When the terminals both have transmission and reception functionality, each terminal may be both the transmit end and the receive end. In one embodiment, the communications system 100 further includes a terminal that may be used for cellular communication. The cellular communication is communication between the terminal and the base station. For example, terminals T1, T2, and T3 in FIG. 1 perform cellular communication by using an access link. Certainly, a cellular terminal may also have communication functionality with another terminal. For example, the terminal T1, the terminal T2, and the terminal T3 may also have communication functionality with another terminal. Similarly, the terminal T4, the terminal T5, the terminal T6, and the terminal T7 all may also have cellular communication functionality.

In the communications system 100 in FIG. 1, the plurality of terminals may be in coverage of a same base station, and the plurality of terminals may be served by the same base station. For example, referring to FIG. 1, the terminals T1 to T7 are in coverage of a base station 20, and are served by the base station 20.

The plurality of terminals in the communications system 100 may alternatively be in coverage of different base stations. In other words, different terminals may be served by different base stations. In this case, the communications system 100 may include a plurality of base stations. The plurality of base stations may be controlled by one control node. Alternatively, the plurality of base stations may exchange information with each other, and are controlled by one of the base stations that serves as a control node. The base station serving as the control node may perform unified resource scheduling, management, and the like based on information sent by another base station and information obtained and maintained by the base station. For example, in FIG. 1, a BS 60 may serve as the control node, and certainly, a function of the control node may be alternatively implemented by another base station. This is not limited in this embodiment of this disclosure.

In this embodiment of this disclosure, the communications system 100 may be any system using radio access technology (RAT), for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, or another system. The terms "system" and "network" may be interchanged with each other. Radio technology such as universal terrestrial radio access (UTRA) or CDMA 2000 may be implemented in the CDMA system. The UTRA may include a wideband CDMA (WCDMA) technology and another technology transformed from the CDMA. The CDMA 2000 may cover interim standard (IS) 2000 (IS-2000), IS-95, and IS-856. Radio technology such as the global system for mobile communications (GSM) may be implemented in the TDMA system. Radio technology such as the evolved universal terrestrial radio access (E-UTRA), ultra mobile broadband (UMB), IEEE 802.11 (Wi-Fi), IEEE 802.16 (WiMAX), IEEE 802.20, or Flash OFDMA may be implemented in the OFDMA system. UTRA is corresponding to UMTS, and E-UTRA is corresponding to an evolved version of UMTS. Various versions of the long term evolution (LTE) and various versions evolved based on the LTE that are formulated by the 3GPP are new versions of the UMTS in the E-UTRA.

In addition, future-oriented communication technology may be further applied to the communications system 100. Provided that a communications system using new communication technology includes communication between terminals, the technical solution provided in the embodiments of this disclosure may be applied to the communications system. A system architecture and a service scenario that are described in the embodiments of this disclosure are used to describe the technical solutions in the embodiments of this disclosure more clearly, but do not constitute limitation on the technical solutions provided in the embodiments of this disclosure. A person of ordinary skill in the art may learn that, with evolution of a network architecture and emergence of a new service scenario, the technical solutions provided in the embodiments of this disclosure are also applicable to a similar technical problem.

The base station (for example, the BS 20) in the embodiments of this disclosure is an apparatus that is deployed in a radio access network and configured to provide wireless communication functionality for a terminal. The base station may include any form of a macro base station, a micro base station (also referred to as a small cell), a relay station, an access point, or the like. Devices having functions of a base station may have different names in systems that use different radio access technologies. For example, in an LTE system, the device is referred to as an evolved NodeB (eNB or eNodeB); and in a 3rd generation (3G) system, the device is referred to as a NodeB or the like. For ease of description, in all the embodiments of this disclosure, the foregoing apparatuses that provide a wireless communication function for the terminal are collectively referred to as a base station.

In this embodiment of this disclosure, the control node is connected to one or more base stations. The control node may perform unified scheduling on resources in the system, configure a resource for the terminal, make a decision for resource multiplexing, perform interference coordination, or the like. In the communications system shown in FIG. 1, the control node may be connected to a plurality of base stations, and configure resources for a plurality of terminals and cellular terminals in coverage of the plurality of base stations. In an exemplary embodiment, the base station may be a NodeB in a UMTS system, and the control node may be a network controller. In another exemplary embodiment, the base station may be a small cell, and the control node may be a macro base station that covers the small cell. In yet another exemplary embodiment, the control node may be a wireless network cross-standard coordination controller or the like. The base station is a base station in a wireless network. This is not limited in this embodiment of this disclosure.

The terminal in the embodiments of this disclosure may include any handheld device, in-vehicle device, wearable device, or computing device that has wireless communication functionality, or another processing device connected to a wireless modem. The terminal may alternatively be a mobile station (MS) or a terminal device; or may be a subscriber unit, a cellular phone), a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, or the like. For ease of description, the devices mentioned above are collectively referred to as the terminal in all the embodiments of this disclosure.

It should be noted that the number of terminals and the type of terminal included in the communications system 100 shown in FIG. 1 are merely examples, and this embodiment of the present invention is not limited thereto. For example, the communications system 100 may further include more terminals that communicate with the base station, or include more terminals that communicate with each other. For clarity of description, details are not described in the accompanying drawings. In addition, in the communications system 100 shown in FIG. 1, although the BS 20, and the terminal T1 to the terminal T7 are shown, the communications system 100 may include but is not limited to the base station and the terminal. For example, the communications system 100 may further include a core network device, a device configured to bear a virtualized network function, or the like. This is obvious to a person of ordinary skill in the art, and details are not described herein.

The following describes channel sounding technology for communication between terminals and a corresponding apparatus embodiment with reference to FIG. 1 to FIG. 16. When a transmission resource allocated for channel sounding between the terminals is configured, the transmission resource used for channel sounding may be configured by the base station, or the related resource may be configured by the control node or another network-side device. After configuring the transmission resource allocated for channel sounding, the base station may notify to a corresponding terminal the configured transmission resource for channel sounding. The transmission resource for channel sounding is notified to the terminal means that the terminal is aware of the allocated transmission resource used for channel sounding. in one example embodiment, information about the allocated transmission resource for channel sounding may be explicitly or implicitly notified to the terminal. In another example embodiment, after configuring the transmission resource allocated for channel sounding, the control node may alternatively notify, to the base station that covers the corresponding terminal, the transmission resource used for channel sounding, and then the base station notifies, to the terminal in the coverage of the base station, the transmission resource used for channel sounding.

Figure 2:
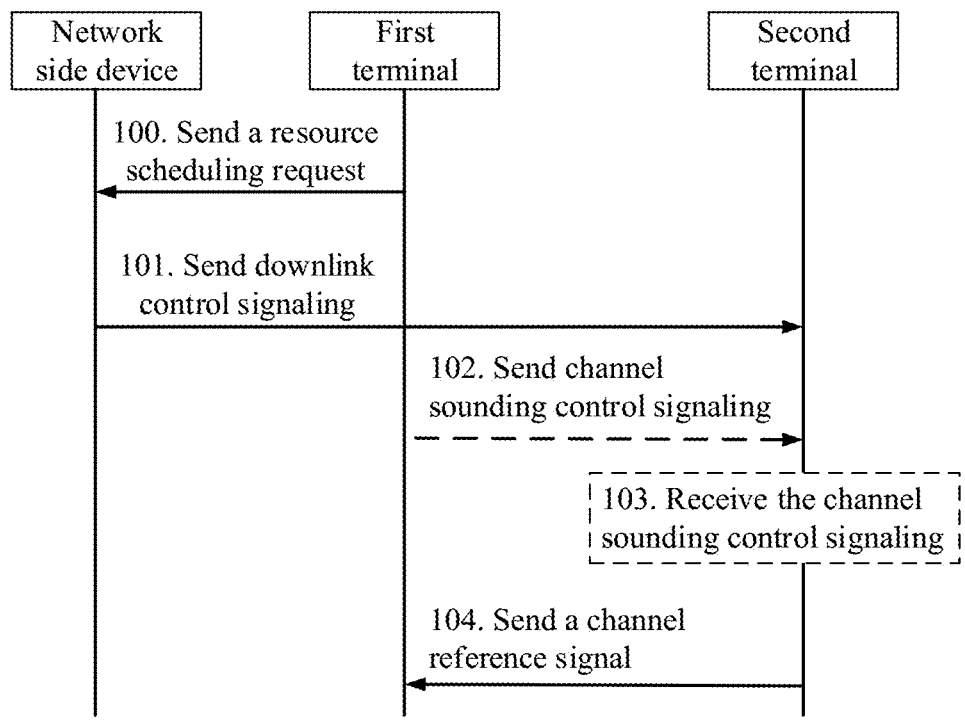
FIG. 2 is a schematic flowchart of a method for performing channel sounding according to an embodiment of this disclosure.

FIG. 2 is a schematic diagram of a method for sending a sounding reference signal between terminals in a communications system according to an embodiment of this disclosure.

In this embodiment of this disclosure, when the terminal starts a communication connection with one or more other terminals in order to measure a channel between the terminal and another terminal, the terminal actively requests, from the network-side device, a transmission resource used for channel sounding, and triggers a process of channel sounding between the terminal and the another terminal. The following uses, as an example for description, a scenario in which one terminal establishes a communication connection with another terminal.

In some embodiments, the method may include:

Step 100: the terminal (denoted as a first terminal in FIG. 2) establishes a communication connection with the another terminal (denoted as a second terminal in FIG. 2), the terminal sends a resource scheduling request to the network-side device. The resource scheduling request is configured to request the network-side device to allocate a transmission resource used for channel sounding between the first terminal and the second terminal.

The resource scheduling request may carry information about the another terminal, for example, at least one of a number of other terminals, a type of another terminal, and an identifier of another terminal.

After receiving the resource scheduling request for the channel sounding from the first terminal, the network-side device configures the transmission resource for the channel sounding, where the transmission resource may include a transmission resource that is configured for the second terminal to send a sounding reference signal; and send information about the transmission resource used for the channel sounding to the second terminal by using downlink control signaling.

Step 104: The second terminal sends the sounding reference signal to the first terminal on the transmission resource allocated for sending the sounding reference signal.

In one embodiment, the method may further include: after receiving the resource scheduling request from the first terminal, configuring, by the network-side device for the first terminal, a transmission resource used for the channel sounding.

In step 102, the first terminal receives the information about the transmission resource sent by the network-side device, and sends sounding control signaling on the transmission resource allocated for the channel sounding. The sounding control signaling is configured to trigger the second terminal to send the sounding reference signal.

The first terminal sends, on the transmission resource, the sounding control signaling for triggering the second terminal to send the sounding reference signal. The sounding control signaling may carry an indication of the transmission resource allocated for sending the sounding reference signal and that is configured by the network-side device for the second terminal.

Step 103: The second terminal receives sounding control signaling from the first terminal. Then, step 104 is performed.

Therefore, the first terminal may obtain information about a channel that is used for communication between the first terminal and the second terminal, to quickly and effectively perform the channel sounding and establish a communication channel between the terminal and another terminal, thereby improving communication efficiency and resource utilization.

Figure 3:
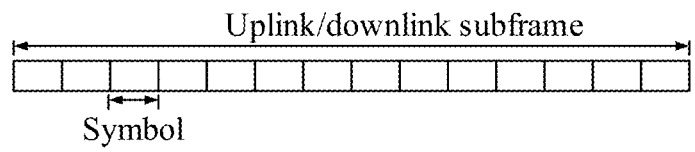
FIG. 3 is a schematic diagram of an uplink/downlink subframe according to an embodiment of this application.
Figure 4:
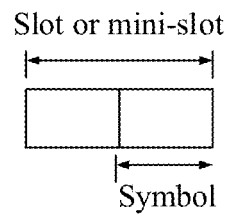
FIG. 4 is a schematic diagram of a slot/mini-slot according to an embodiment of this disclosure.

It should be noted that, in all the embodiments of this disclosure, a granularity of the transmission resource allocated for the channel sounding and that is configured by the network-side device for the first terminal or the second terminal includes a subframe, as shown in FIG. 3, and may further be a slot or a mini-slot, as shown in FIG. 4. The slot, and the mini-slot each have a relatively small number of OFDM symbols, for example, only four or six OFDM symbols.

Figure 5:
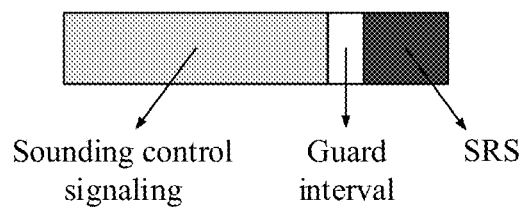
FIG. 5 is a schematic diagram of a subframe configuration according to an embodiment of this disclosure.

In the following embodiment, the granularity of the transmission resource in a form of subframe is mainly used for description. A principle of the slot and a principle of the mini-slot are the same as that described in the following, and details are not described. As shown in FIG. 5, in an implementation, the transmission resource allocated for the channel sounding and allocated by the network-side device to the first terminal and the second terminal may be implemented based on a flexible subframe, and both information of a transmit end and information of a receive end may be transmitted in the flexible subframe. The flexible subframe may be a self-contained subframe. The following uses the self-contained subframe as an example for description. However, a structure of the subframe is also applicable to another subframe used for channel sounding between terminals.

The self-contained subframe is a subframe that may be used for both uplink transmission and downlink transmission. A guard interval is usually configured between the uplink transmission and the downlink transmission for separation. When applied to a scenario of communication between the terminals, the self-contained subframe includes three parts: a first part utilized from the transmit end to the receive end, a guard interval, and a second part utilized from the receive end to the transmit end. For example, in the foregoing embodiment, the self-contained subframe may include: the first part utilized by the first terminal to transmit the sounding control signaling to the second terminal, a guard interval, and the second part utilized by the second terminal to transmit the sounding reference signal to the first terminal.

The terminal may send the sounding control signaling to the another terminal on the first part of the self-contained subframe. After the another terminal receives the sounding control signaling and the guard interval expires, the another terminal sends the SRS to the terminal on the second part of the self-contained subframe.

In a specific implementation, the first part of the self-contained subframe includes N1 symbols, the guard interval includes N2 symbols, and the second part includes N3 symbols, where N1, N2, and N3 are positive integer.

Figure 6:
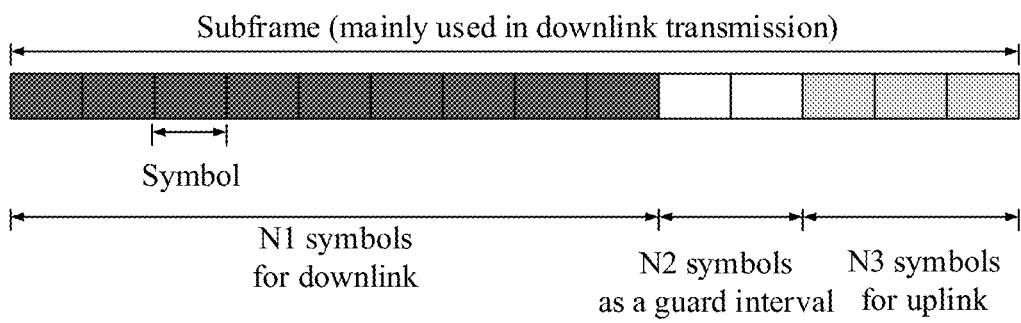
FIG. 6 is a schematic diagram of a subframe configuration according to another embodiment of this disclosure.

The self-contained subframe including 14 symbols is used as an example. Implementations of a number of symbols in the first part of the self-contained subframe, a number of symbols in the guard interval, and a quantity of symbols in the second part may be as follows:

As shown in FIG. 6, in a format of subframe that is mainly utilized in downlink transmission, the first part of the self-contained subframe includes a first symbol to a ninth symbol, the guard interval includes a tenth symbol, and the second part includes an eleventh symbol to a fourteenth symbol.

Alternatively, the first part of the self-contained subframe includes a first symbol to a tenth symbol, the guard interval includes an eleventh symbol, and the second part includes a twelfth symbol to a fourteenth symbol.

Figure 7:
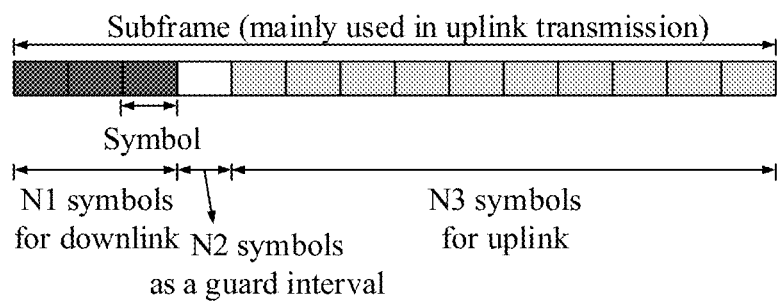
FIG. 7 is a schematic diagram of a subframe configuration according to still another embodiment of this disclosure.

As shown in FIG. 7, in a format of subframe that is mainly utilized in uplink transmission, the first part of the self-contained subframe includes a first symbol to a third symbol, the guard interval includes a fourth symbol, and the second part includes a fifth symbol to a fourteenth symbol.

Alternatively, the first part of the self-contained subframe includes a first symbol to a second symbol, the guard interval includes a third symbol, and the second part includes a fourth symbol to a fourteenth symbol.

This is used only as an example. There may be other forms of implementations of a number of symbols in the first part, a quantity of symbols in the guard interval, and a number of symbols in the second part in the self-contained subframe. If the self-contained subframe is implemented by using the mini-slot, the first part may occupy only one symbol, the second part also has only one symbol, and one symbol is used as the guard interval between the first part and the second part.

For example, the terminal T4 in FIG. 1 sends sounding control signaling on the first part of the self-contained subframe. After receiving the sounding control signaling, the terminal T5 sends an SRS on the second part of the self-contained subframe. After receiving the SRS from the terminal T5, the terminal T4 may obtain information about a channel between the terminal T4 and the terminal T5.

In the solution provided in this embodiment, because both the sounding control signaling and the SRS can be transmitted in the same self-contained subframe, the channel sounding can be quickly and effectively performed, and a transmission delay of the communication between the terminals can be reduced, thereby improving communication efficiency and resource utilization.

In a possible embodiment, a manner in which the channel sounding is completed by transmitting the sounding control signaling and SRS information by using the self-contained subframe may be implemented in a process of the communication between the terminals.

Figure 8:
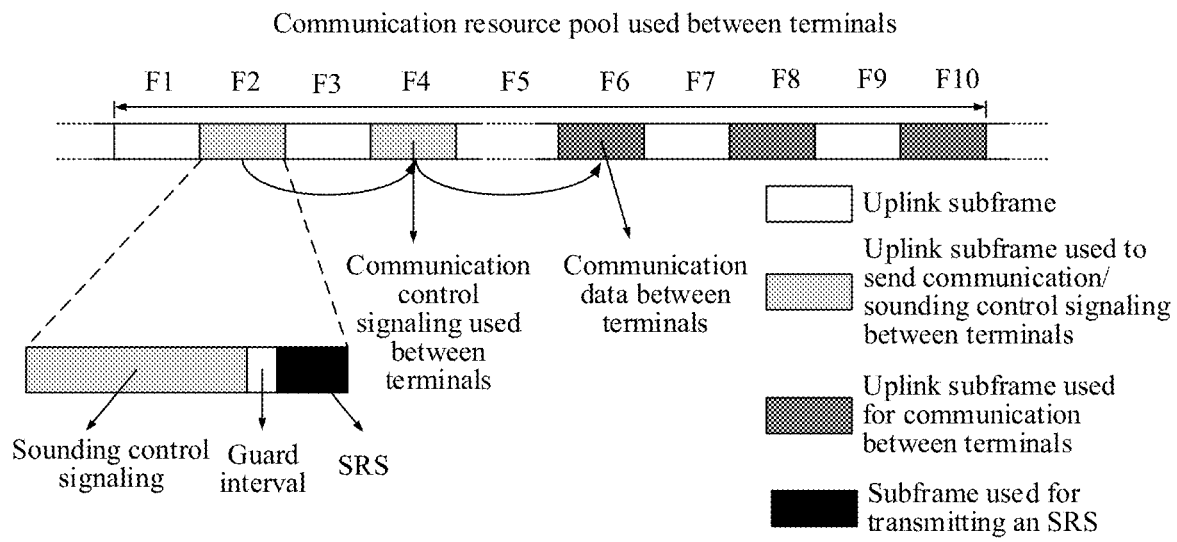
FIG. 8 is a schematic diagram of a resource configuration according to an embodiment of this disclosure.
Figure 9:
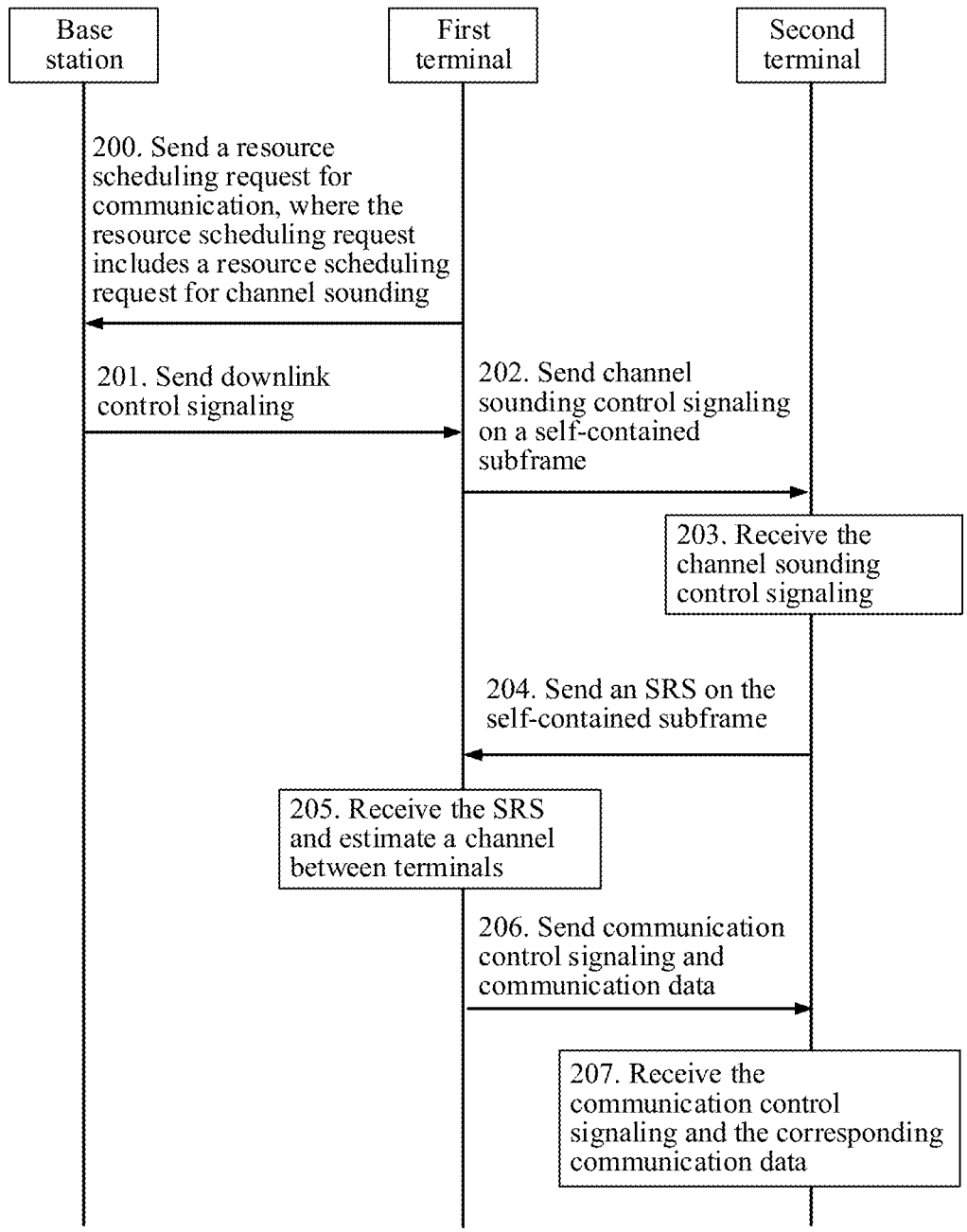
FIG. 9 is a schematic flowchart of a method for performing channel sounding according to another embodiment of this disclosure.

FIG. 8 and FIG. 9 are schematic diagrams of implementing channel sounding between terminals by using a self-contained subframe in a communication resource used between the terminals.

A resource allocated by the network-side device to the terminal is shown in FIG. 8. A communication resource pool used for communication between the terminals is divided into a plurality of subframes, for example, F2, F4, F6, F8, and F10. Other white subframe parts such as F1, F3, and F5 are used to transmit other uplink data. Herein, F1 to F10 and the like are symbols for distinguishing between the described objects, and the described objects may alternatively be marked by using any other forms of symbols. Meanings of the symbols are not specifically limited in this disclosure document.

A light-gray subframe part F2 is a self-contained subframe, and the self-contained subframe is used to transmit sounding control signaling and an SRS. A light-gray part of the self-contained subframe F2 is used by the terminal to send sounding control signaling to another terminal, a middle part is a guard interval, and a black part is used by the another terminal to send an SRS to the terminal. A light-gray subframe part F4 is used to transmit communication control signaling between the terminals, and dark-gray subframe parts F6, F8, and F10 are used to transmit communication data between the terminals.

A structure and transmission content of the self-contained subframe in this embodiment are the same as those described in the foregoing embodiment. Details are not described herein again.

As shown in FIG. 9, an embodiment provides a method for performing channel sounding between terminals, including the following steps.

Step 200: A first terminal initiates a communication connection with a second terminal, the first terminal first sends a resource scheduling request to a network-side device, for example, a base station in this embodiment.

The resource scheduling request is configured to notify the base station that the first terminal initiates a communication connection with the second terminal or that the first terminal triggers another terminal (for example, the second terminal) to perform channel sounding between the terminals.

In this embodiment, the transmission resource scheduling request allocated for the channel sounding is sent together with a transmission resource scheduling request used for communication between the terminals.

Step 201: After receiving the resource scheduling request sent by the first terminal, the base station allocates, to the first terminal, a transmission resource (for example, a subframe F2) that is used to transmit sounding control signaling, a transmission resource (for example, a subframe F4) that is used to transmit communication control signaling between the first terminal and the second terminal, and a transmission resource (for example, F6, F8, and F10) that is used to transmit communication data between the first terminal and the second terminal, generates downlink control signaling, and sends the downlink control signaling to the first terminal.

Step 202: After receiving the downlink control signaling from the base station, the first terminal generates the sounding control signaling and the communication control signaling between the terminals (communication control signaling between the first terminal and the second terminal in this embodiment) according to an indication of the downlink control signaling, and first sends the sounding control signaling to the second terminal by using a first transmission part (a light-gray part of F2) of a self-contained subframe.

Step 203: The second terminal receives the sounding control signaling in a communication resource pool.

Step 204: The second terminal sends the SRS to the first terminal according to an indication of the sounding control signaling after the guard interval (a white part of F2), in other words, on a second transmission part (a black part of F2) of the self-contained subframe.

It should be noted that, the foregoing step 201 to step 203 may alternatively be omitted. The network-side device directly allocates, to the second terminal, the self-contained subframe for transmitting the SRS, and the second terminal directly sends the SRS to the first terminal on the second transmission part of the self-contained subframe.

Step 205: After receiving the SRS sent by the second terminal, the first terminal estimates, based on the SRS, a channel used for communication between the first terminal and the second terminal.

Step 206: The first terminal sends, to the second terminal by using the estimated channel, the communication control signaling and the communication data between the terminals.

Step 207: The second terminal receives, on the estimated channel, the communication control signaling and the communication data that are sent by the first terminal to the second terminal.

Therefore, in this embodiment of this disclosure, by using the self-contained subframe, the first terminal sends the sounding control signaling to the second terminal and receives the SRS sent by the second terminal. With small resource consumption, a process of the channel sounding between the first terminal and the second terminal can be completed, a channel status of the second terminal is obtained, and the channel sounding process is combined with the communication process of the terminals, thereby simplifying a procedure. Especially, when there are a large quantity of terminals in a communications system, such advantage is more obvious.

In another embodiment, the network-side device may configure a dedicated sounding subframe to implement channel sounding between terminals.

Figure 10:
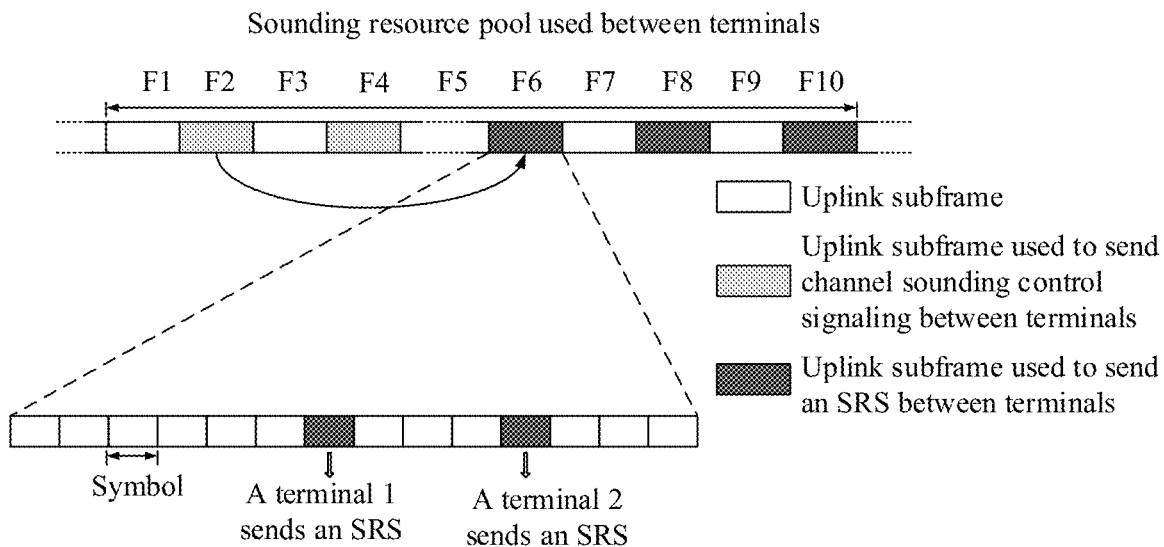
FIG. 10 is a schematic diagram of a resource configuration according to another embodiment of this disclosure.

In this embodiment, a resource pool dedicated for sounding is first defined. The resource pool is used for channel sounding between the terminals. The sounding resource pool includes an uplink subframe used to send sounding control signaling, and a corresponding uplink frequency band; and also includes a dedicated uplink subframe that is used by a terminal to send an SRS, and a corresponding uplink frequency band. FIG. 10 is a schematic diagram of a transmission resource pool that is used for channel sounding and that is configured by a network-side device for a terminal. The transmission resource pool used for channel sounding is divided into a plurality of subframes, for example, F2, F4, F6, F8, and F10. Other white subframe parts such as F1, F3, and F5 are used to transmit other uplink sounding data. All symbols in light-gray subframe parts F2 and F4 are used to transmit sounding control signaling, and dark-gray subframe parts F6, F8, and F10 are used to transmit an SRS.

It should be noted that, one or more symbols of the subframes F6, F8, and F10 that are used to transmit the SRS may be used to transmit the SRS. For example, a terminal T1 serving as a receive end transmits the SRS on one symbol, and a terminal T2 serving as a receive end transmits the SRS on another symbol.

Figure 11:
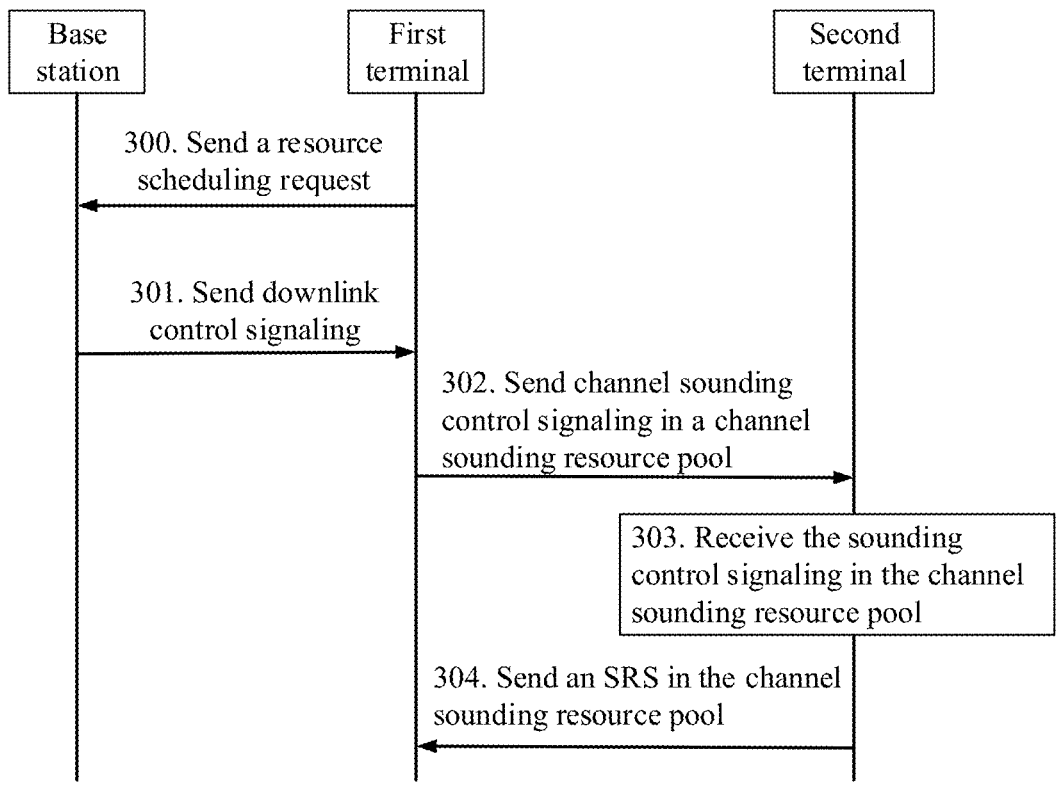
FIG. 11 is a schematic flowchart of a method for performing channel sounding according to still another embodiment of this disclosure.

For a specific procedure, refer to FIG. 11. In this embodiment, it is assumed that a network-side device is a BS, and a terminal is a terminal used for D2D communication. The following uses a specific example to describe an embodiment in which a D2D terminal and a BS cooperate to implement channel sounding and D2D communication between a plurality of terminals.

Step 300: When a first terminal needs to trigger one or more second terminals to send a D2D SRS, the first terminal sends a resource scheduling request in a sounding resource pool.

A difference from the foregoing embodiment is as follows: In step 301, the base station allocates a transmission resource that is correspondingly used by the first terminal to send sounding control information and a transmission resource (for example, a first gray subframe F2 in FIG. 10 is a transmission resource that is allocated by the BS and that is used by the first terminal to send sounding control signaling, a seventh symbol and an eleventh symbol of a first dark subframe F6 are transmission resources that are allocated by the base station and that are used by two triggered second terminals to send the SRS between the terminals, and other symbols of the subframe may be used by another triggered terminal serving as a receive end to send the SRS between the terminals) that is used by the one or more second terminals triggered by the terminal to send the SRS.

Step 302: The first terminal sends sounding control signaling to the second terminal in the sounding resource pool.

Step 303 and step 304: After receiving the sounding control signaling, the second terminal sends the SRS on a corresponding subframe and symbol according to an indication of the sounding control signaling. This process is similar to that in the foregoing embodiment. Details are not described herein again.

It should be noted that, in this embodiment, steps 301 to 303 may alternatively be omitted, and the network-side device directly allocates, to the second terminal, a dedicated uplink sounding subframe for transmitting the SRS, and the second terminal directly sends the SRS to the first terminal on the dedicated uplink sounding subframe.

In the solution provided in this embodiment, the dedicated uplink sounding subframe is configured, the uplink subframe includes a plurality of sounding symbols, and each sounding symbol is dedicated for sending sounding control signaling and receiving a sounding reference signal. Therefore, the terminal may send the sounding control signaling to a plurality of terminals at a same moment. Another sounding symbol of the dedicated sounding uplink subframe is used to receive a sounding reference signal returned by the plurality of terminals. The terminal may simultaneously trigger the plurality of terminals to perform channel sounding, thereby improving channel sounding efficiency. Based on the channel sounding method, a communication channel may be quickly established between the terminals, thereby further improving communication efficiency and resource utilization.

In an implementation, the transmission resource used for channel sounding is implemented by configuring a communication uplink subframe.

In this embodiment, a resource pool used for channel sounding is not specifically defined. Instead, the channel sounding is performed based on the existing resource pool used for the communication between the terminals.

Figure 12:
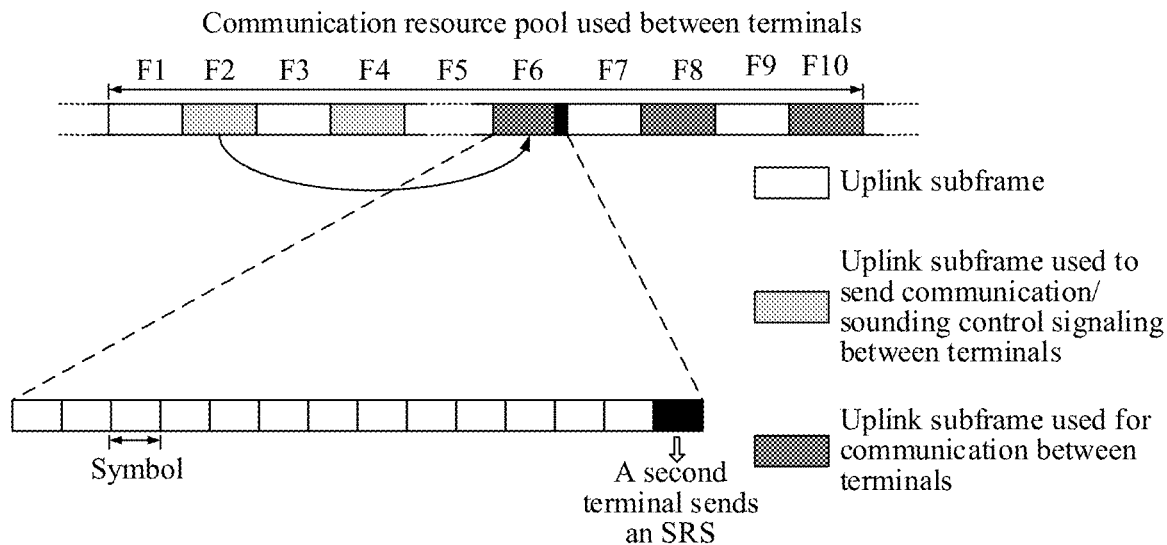
FIG. 12 is a schematic diagram of a resource configuration according to yet another embodiment of this disclosure.

FIG. 12 shows an example of allocating a resource for sounding based on an existing communication resource pool used between terminals. Communication resources between the terminals include a subframe in a light-gray part such as F2 and F4; and dark-gray subframes such as F6, F8, and F10. Other white subframe parts such as F1, F3, and F5 are used to transmit other uplink data. The light-gray subframe used for communication between the terminals is used as a transmission resource used for channel sounding between the terminals.

Herein, F6 is used as an example. The dark-gray subframe F6 is originally an uplink subframe that is used to transmit communication data between the terminals and that is indicated by the base station. In this embodiment of this disclosure, the network-side device instructs a second terminal to send an SRS to a first terminal by using a last symbol of the uplink subframe used by the second terminal to transmit the communication data. Certainly, in another implementation, the second terminal may alternatively send the SRS on the last symbol or a middle symbol of the subframe, and a quantity of symbols is not limited to one. This is used only as an example for description herein. The protection scope and the embodiments of this disclosure are not limited thereto.

Figure 13:
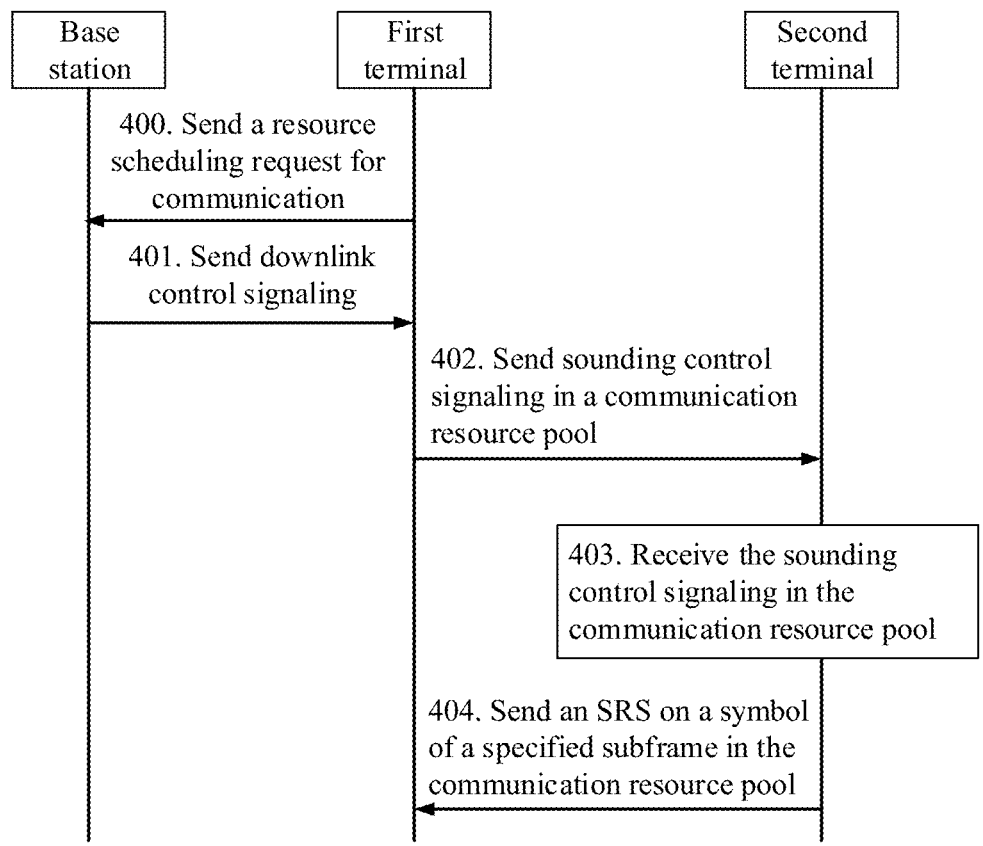
FIG. 13 is a schematic flowchart of a method for performing channel sounding according to another embodiment of this disclosure.

For a specific procedure, refer to FIG. 13. In this embodiment, it is assumed that a network-side device is a base station, and a method for implementing channel sounding between a first terminal and a second terminal is as follows:

Step 400: A first terminal sends a scheduling request for a sounding resource to a base station.

Step 401: When the base station receives the scheduling request, the base station indicates, in an existing resource pool that is in a system and that is used for communication between terminals, a subframe that can be used by a second terminal to send an SRS (for example, the second terminal may send the SRS on a last symbol of a subframe F6, another symbol of the subframe F6 is still used for communication transmission between the first terminal and the second terminal, and this is similar to the uplink SRS). In one embodiment, a transmission resource required by the first terminal for transmitting sounding control signaling is also allocated, for example, F2 or F4, and corresponding downlink control signaling is generated and sent to the first terminal.

Step 402: After receiving the downlink control signaling sent by the base station, the first terminal generates the corresponding sounding control signaling according to an indication of the signaling, and sends the sounding control signaling to the second terminal.

Step 403 and step 404: After receiving the sounding control signaling, the second terminal sends the SRS on a corresponding subframe and symbol according to an indication of the sounding control signaling. This process is similar to that in the foregoing embodiment. Details are not described herein again.

It should be noted that, in this embodiment, steps 401 to 403 may alternatively be omitted, and the network-side device directly allocates, to the second terminal, a communication uplink subframe for transmitting the SRS, and the second terminal directly sends the SRS to the first terminal on the communication uplink subframe.

In the solution provided in this embodiment, an existing uplink subframe is used for communication between the terminals, and some symbols in the subframe are used for channel sounding between the terminals. Specifically, the first terminal may send the sounding control signaling to the terminal by using a first communication uplink subframe, and the second terminal returns a sounding reference signal on a symbol of a second communication uplink subframe. The symbol may be last one or more symbols or first one or more symbols in the second communication uplink subframe. Therefore, the channel sounding between the terminals and existing communication between the terminals are combined and seamlessly integrated, thereby reducing signaling overheads, improving D2D link establishment efficiency, and improving communication efficiency and resource utilization.

The foregoing sounding control signaling includes at least a sounding trigger indication and a cell radio network temporary identifier (C-RNTI) of the second terminal. In one embodiment, the sounding control signaling may further include a timing advance or indication information that is used to indicate a subframe used by the second terminal to send the SRS.

In one embodiment, in the foregoing three embodiments, the first terminal may periodically send, on the transmission resource used for channel sounding, the sounding control signaling that is used to trigger the second terminal to send the sounding reference signal. In this way, continuity and timeliness of channel sounding between the terminals are ensured.

In one embodiment, in the foregoing three embodiments, the first terminal and the second terminal may be terminals with a same attribute. For example, adjacent terminals are classified into one attribute group based on geographical location information, or terminals having a same service are classified into one attribute group based on a service type, or terminals in a same type are classified into one attribute group based on a terminal type. For example, the terminals are all in-vehicle terminals or mobile phone terminals. Terminals in a same attribute group perform channel sounding and establish a communications link, to effectively reduce signaling overheads.

In the foregoing embodiments provided in this disclosure, solutions of the method for channel sounding between terminals that is provided in the embodiments of this disclosure are separately described from a perspective of network elements and interaction between the network elements. It can be understood that to implement the foregoing functions, network elements, for example, the terminal, the base station, and the control node include a corresponding hardware structure and/or software module that perform/performs the functions. A person skilled in the art should be easily aware that units and algorithm steps in the examples described with reference to the embodiments disclosed in this specification may be implemented in a form of hardware or in a form of a combination of hardware and computer software in this disclosure. Whether a function is implemented by hardware or in a manner of driving hardware by computer software depends on a particular application and design constraint condition of the technical solution. A person skilled in the art may use different methods to implement the described functions for each particular application, but it should not be considered that such implementation goes beyond the scope of this application.

Figure 14:
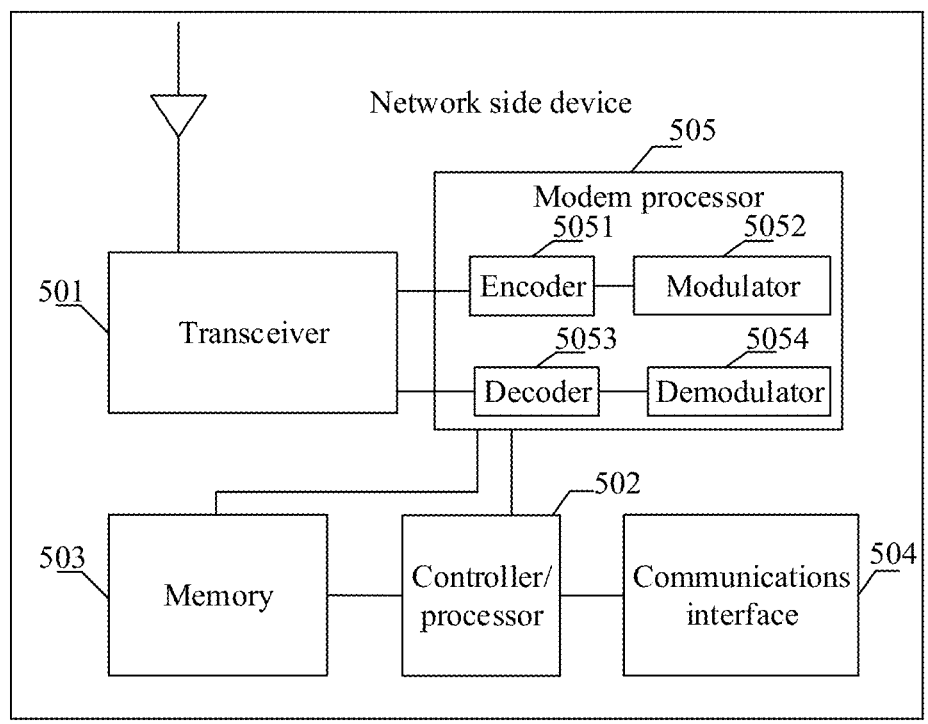
FIG. 14 is a schematic structural diagram of a base station according to an embodiment of this disclosure.

FIG. 14 is a possible schematic structural diagram of the network-side device in the foregoing embodiments. The network-side device includes at least a transceiver 501 and a controller/processor 502. The transceiver 501 receives a resource scheduling request from a first terminal, where the resource scheduling request is used to request the network-side device to allocate a transmission resource used for channel sounding between the first terminal and a second terminal, and the scheduling request carries information about the second terminal. The controller/processor 502 is used to configure, for the second terminal, a transmission resource used for channel sounding, where the transmission resource used for channel sounding is used by the second terminal to send a sounding reference signal.

In an optional embodiment, the first terminal may trigger the second terminal to send sounding control signaling. In this case, the controller/processor 502 is further used to configure, for the first terminal, a transmission resource used for channel sounding, where the transmission resource used for channel sounding is used by the first terminal to send the sounding control signaling.

For a format and an allocation manner of the transmission resource, refer to descriptions in the foregoing method embodiments.

Functions of the foregoing controller/processor 502 may be implemented by using a circuit, or may be implemented by executing software code by commodity hardware. When the functions of the foregoing controller/processor 502 are implemented by executing the software code by the commodity hardware, the network-side device may further include a memory 503 in addition to the foregoing transceiver 501 and controller/processor 502. The memory 503 is configured to store program code that can be executed by the controller/processor 502. When the controller/processor 502 runs the program code stored in the memory 503, the foregoing functions are performed.

In addition to the foregoing functions, in steps performed by the network-side device in FIG. 2, FIG. 9, FIG. 11, or FIG. 13, all steps that require processing inside the network-side device may be implemented by the foregoing controller/processor 502.

Further, the network-side device may further include an encoder 5051, a modulator 5052, a demodulator 5054, and a decoder 5053. The encoder 5051 is configured to: obtain data/signaling that is to be sent by the network-side device to the terminal or another network-side device, and encode the data/signaling. The modulator 5052 modulates the data/signaling that has been encoded by the encoder 5051, and then transmits the modulated data/signaling to the transceiver 501. The transceiver 501 sends the modulated data/signaling to the terminal or the another network side device.

The demodulator 5054 is configured to: obtain data/signaling that is sent by the terminal or the another network-side device to the current network-side device, and perform demodulation. The decoder 5053 is configured to decode the data/signaling that has been demodulated by the demodulator 5054.

The encoder 5051, the modulator 5052, the demodulator 5054, and the decoder 5053 may be implemented by an integrated modem processor 505. These units perform processing based on a radio access technology (such as an access technology in LTE and another evolved system) used in a radio access network.

The network-side device may further include a communications interface 504. The communications interface 504 is configured to support the network-side device in communicating with another network entity. For example, the communications interface 504 is configured to support a base station in communicating with another communications network entity shown in FIG. 1, for example, a control node 60.

It may be understood that FIG. 14 shows only a simplified design of the network-side device. In actual application, the transceiver 501 may include a transmitter and a receiver, and the network-side device may include any quantity of transceivers, processors, controllers/processors, memories, and/or communications interfaces.

Figure 15:
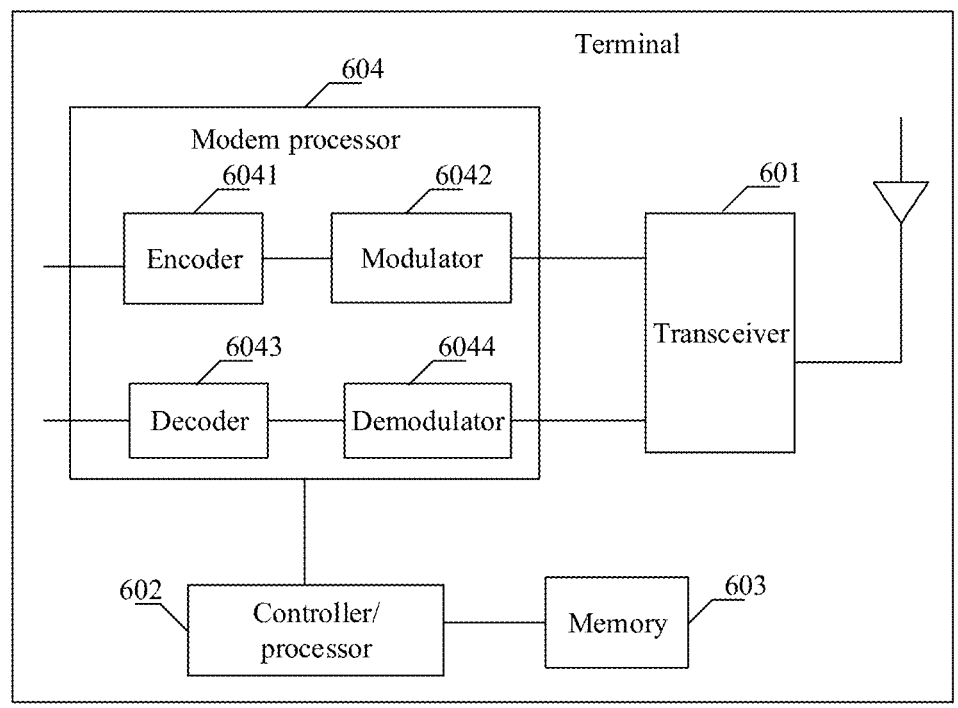
FIG. 15 is a schematic structural diagram of a terminal according to an embodiment of this disclosure.

FIG. 15 is a simplified schematic diagram of a possible design structure of the terminal in the foregoing embodiments. The terminal may be one of the terminals T4, T5, T6, and T7 shown in FIG. 1. For ease of description, it is assumed that the terminal is a first terminal ("first" herein has no special meaning and is only used to distinguish the terminal from another terminal). The first terminal includes at least a transceiver 601 and a controller/processor 602.

The transceiver 601 is configured to: send a resource scheduling request to a network-side device, where the resource scheduling request is used to request the network-side device to allocate a transmission resource used for channel sounding between the first terminal and a second terminal, and the resource scheduling request carries information about the second terminal; and then receive a sounding reference signal sent by the second terminal on the transmission resource used for channel sounding.

The controller/processor 602 is configured to obtain information about a channel used for communication between the first terminal and the second terminal.

The controller/processor 602 is further configured to instruct the transceiver 601 to send sounding control signaling on the transmission resource, where the sounding control signaling is used to trigger the second terminal to send the sounding reference signal.

For a format and an allocation manner of the transmission resource, refer to descriptions in the foregoing method embodiments.

Functions of the foregoing controller/processor 602 may be implemented by using a circuit, or may be implemented by executing software code by commodity hardware. When the functions of the foregoing controller/processor 602 are implemented by executing the software code by the commodity hardware, the first terminal may further include a memory 603 in addition to the foregoing transceiver 601 and controller/processor 602. The memory 603 is configured to store program code that can be executed by the controller/processor 602. When the controller/processor 602 runs the program code stored in the memory 603, the foregoing functions are performed.

Further, the first terminal may further include an encoder 6041, a modulator 6042, a demodulator 6044, and a decoder 6043. The encoder 6041 is configured to obtain data/signaling that is to be sent by the first terminal to the network-side device or another terminal, and encode the data/signaling. The modulator 6042 modulates the data/signaling that has been encoded by the encoder 6041, and then transmits the modulated data/signaling to the transceiver 601. The transceiver 601 sends the modulated data/signaling to the network-side device or the another terminal.

The demodulator 6044 is configured to: obtain data/signaling that is sent by the network-side device or the another terminal to the first terminal, and perform demodulation. The decoder 6043 is configured to decode the data/signaling that has been demodulated by the demodulator 6044.

The encoder 6041, the modulator 6042, the demodulator 6044, and the decoder 6043 may be implemented by an integrated modem processor 604. These units perform processing based on a radio access technology (such as an access technology in LTE and another evolved system) used in a radio access network.

Figure 16:
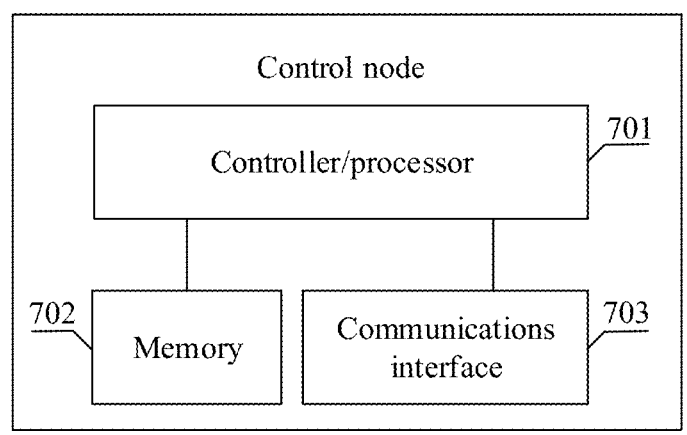
FIG. 16 is a schematic structural diagram of a control node according to an embodiment of this disclosure.

The controller/processor 602 controls and manages an action of the terminal, so that components cooperate to implement the steps performed by the terminal in the foregoing method embodiments. For example, if the terminal is a transmit end, the controller/processor 602 may be configured to instruct, based on downlink control signaling (the downlink control signaling includes a transmission resource that is allocated by the network-side device and that is used for channel sounding between two terminals) delivered by the network-side device such as a base station or a control node, the transceiver 601 to send the sounding control signaling to the second terminal on the transmission resource allocated by the network-side device. If the terminal is a terminal serving as a receive end, the terminal may instruct, based on sounding control signaling sent by the transmit end, the transceiver 601 to return the sounding reference signal to the transmit end. In an example, the controller/processor 602 is configured to support the terminal in executing content related to processing of the terminal in FIG. 2, FIG. 9, FIG. 11, or FIG. 13. FIG. 16 is a schematic diagram of the control node in the foregoing embodiments. The control node may be the control node 60 shown in FIG. 1. The control node may include a controller/processor 701, a memory 702, and a communications interface 703. The controller/processor 701 may be configured to coordinate resource management and configuration between a plurality of base stations, may be configured to perform resource configuration in the foregoing embodiments, and may make a decision for frequency resource multiplexing between communications links, and the like. The memory 702 may be configured to store program code and data that can be executed by the controller/processor 701. The communications interface 703 is configured to support the control node in communicating with a base station, for example, send information about a configured resource to the base station.

The network-side device described in the foregoing embodiments of this disclosure may be the base station shown in FIG. 10, or the control node shown in FIG. 16. When the network-side device is the control node, for a structure and a function of the network-side device, refer to a structure and a function of the base station shown in FIG. 10. Details are not described herein again.

The controller/processor of the terminal, the base station, or the control node is configured to perform functions described in embodiments of this disclosure. The controller/processor may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in this disclosure. Alternatively, the processor may be a combination for implementing a computing function, for example, a combination including one or more microprocessors or a combination of the DSP and a microprocessor.

The methods or algorithm steps described with reference to the content disclosed in this disclosure may be implemented in a hardware manner, or may be implemented in a manner of executing a software instruction (for example, program code) by a processor. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium in any other form well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the terminal. Certainly, the processor and the storage medium may exist in the terminal as discrete components.

A person skilled in the art should be aware that in the foregoing one or more examples, functions described in this disclosure may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium. The communications medium includes any medium that facilitates transmission of a computer program from one place to another. The storage medium may be any available medium accessible to a general purpose computer or a dedicated computer.

The objectives, technical solutions, and benefits of this disclosure are further described in detail in the foregoing specific embodiments. It should be understood that the foregoing descriptions are merely specific embodiments of this disclosure, but are not intended to limit the protection scope of this disclosure. Any modification, equivalent replacement, or improvement made based on technical solutions of this disclosure shall fall within the protection scope of this disclosure.

What is claimed is:

1. A method for performing channel sounding between terminals, comprising:
sending, by a first terminal, a resource scheduling request to a network-side device when the first terminal starts a communication connection with a second terminal, wherein the resource scheduling request is configured to request the network-side device to allocate a transmission resource for channel sounding between the first terminal and the second terminal, and the resource scheduling request carries information about the second terminal;
after sending the resource scheduling request to the network-side device:
sending, by the first terminal, sounding control signaling on the transmission resource to the second terminal, wherein the sounding control signaling triggers the second terminal to send a sounding reference signal; and
receiving, by the first terminal, information about the transmission resource sent by the network-side device, and
receiving, by the first terminal, the sounding reference signal sent by the second terminal on the transmission resource allocated by the network-side device, and obtaining information about a communication channel between the first terminal and the second terminal;
wherein the transmission resource is a slot or a mini-slot, and a number of symbols comprised in the mini-slot is less than a number of symbols comprised in the slot, and the slot or the mini-slot comprises a first symbol and a second symbol;
the first symbol is allocated to the first terminal for transmitting the sounding control signaling;
the second symbol is allocated to the second terminal for transmitting the sounding reference signal; and
the first symbol and the second symbol are different symbols.

2. The method according to claim 1, wherein the transmission resource is a subframe comprising:
a first part allocated to the first terminal for transmitting the sounding control signaling;
a second part allocated to the second terminal for transmitting the sounding reference signal; and
a guard interval disposed between the first part and the second part of the subframe.

3. The method according to claim 1, wherein the transmission resource comprises a first subframe and a second subframe,
the first subframe being allocated to the first terminal for transmitting the sounding control signaling,
the second subframe being allocated to the second terminal for transmitting the sounding reference signal, and
the first subframe and the second subframe being different subframes.

4. The method according to claim 1, wherein the sounding control signaling comprises a sounding trigger indication and a cell radio network temporary identifier of the second terminal.

5. The method according to claim 1, wherein the sounding control signaling is periodically sent.

6. A method for performing channel sounding between terminals, the method comprising:
receiving, by a network-side device, a resource scheduling request from a first terminal, wherein the resource scheduling request is configured to request the network-side device to allocate a transmission resource for channel sounding between the first terminal and a second terminal, and the resource scheduling request carries information about the second terminal; and
allocating, by the network-side device, the transmission resource to the second terminal, wherein the transmission resource comprises a first transmission resource allocated to the first terminal for sending a sounding control signaling to the second terminal, wherein the transmission resource further comprises a second transmission resource allocated to the second terminal for sending a sounding reference signal to the first terminal in response to being triggered by the sounding control signal from the first terminal;
wherein the transmission resource allocated by the network-side device is a slot or a mini-slot, a number of symbols comprised in the mini-slot is less than a number of symbols comprised in the slot, and the slot or the mini-slot comprises a first symbol and a second symbol;
the first symbol is allocated to the first terminal for transmitting the sounding control signaling;
the second symbol allocated to the second terminal for transmitting the sounding reference signal; and
the first symbol and the second symbol are different symbols.

7. The method according to claim 6, wherein the transmission resource is a subframe comprising:
a first part allocated to the first terminal for transmitting the sounding control signaling, and a second part allocated to the second terminal for transmitting the sounding reference signal; and
a guard interval disposed between the first part and the second part of the subframe.

8. The method according to claim 6, wherein
the transmission resource comprises at least a first subframe and a second subframe;

the first subframe is used by the first terminal to transmit the sounding control signaling;

the second subframe is used by the second terminal to transmit the sounding reference signal; and the first subframe and the second subframe are different subframes.

9. A terminal, comprising:

a transceiver configured to:

send a resource scheduling request to a network-side device, wherein the resource scheduling request is used to request the network-side device to allocate a transmission resource used for channel sounding between the terminal and another terminal, and the resource scheduling request carries information about the another terminal;

receive information about the transmission resource from the network-side device;

send sounding control signaling on the transmission resource to the another second terminal, wherein the sounding control signaling is configured to trigger the another terminal to send a sounding reference signal; and receive the sounding reference signal sent by the another terminal on the transmission resource allocated by the network-side device; and a processor configured to obtain information about a communication channel between the terminal and the another terminal; and the processor is further configured to instruct the transceiver to send the sounding control signaling on the transmission resource;

wherein the transmission resource is a slot or a mini-slot, a number of symbols comprised in the mini-slot is less than a number of symbols comprised in the slot, and the slot or the mini-slot comprises a first symbol and a second symbol;

the first symbol is allocated to the terminal for transmitting the sounding control signaling;

the second symbol is allocated to the another terminal for transmitting the sounding reference signal; and the first symbol and the second symbol are different symbols.

10. The terminal according to claim 9, wherein the transmission resource is a subframe comprising:

a first part allocated to a first terminal for transmitting the sounding control signaling;

a second part allocated to a second terminal for transmitting the sounding reference signal; and a guard interval disposed between the first part and the second part of the subframe.

11. The terminal according to claim 9, wherein the transmission resource comprises a first subframe and a second subframe;

the first subframe is allocated to the terminal for transmitting the sounding control signaling;

the second subframe is allocated to the another terminal for transmitting the sounding reference signal; and the first subframe and the second subframe are different subframes.

12. The terminal according to claim 9, wherein the sounding control signaling sent by the transceiver comprises a sounding trigger indication and a cell radio network temporary identifier of the another terminal.

13. The terminal according to claim 9, wherein the sounding control signaling is periodically sent.

* * * * *